June 26, 1962 J. M. WRIGHT 3,040,561
HYDROGEN GAUGE
Filed Nov. 21, 1957 2 Sheets-Sheet 1

June 26, 1962  J. M. WRIGHT  3,040,561
HYDROGEN GAUGE

Filed Nov. 21, 1957   2 Sheets-Sheet 2

United States Patent Office 3,040,561
Patented June 26, 1962

3,040,561
HYDROGEN GAUGE
James M. Wright, Upper St. Clair, Pa., assignor to Westinghouse Electric Corporation, East Pittsburgh, Pa., a corporation of Pennsylvania
Filed Nov. 21, 1957, Ser. No. 697,871
2 Claims. (Cl. 73—23)

The present invention relates to a device for measuring hydrogen concentration, and more particularly to a device of the character described for measuring the concentration of hydrogen dissolved in water or other solvent.

The invention is adapted in one application for use in a sealed system where the water or other solvent is maintained at elevated temperatures and pressures. With such systems it is desired to provide a relatively simple apparatus for analyzing variations in hydrogen concentration therein, the response of which apparatus can be read directly and sufficiently quickly to enable a relatively unskilled operator to monitor the hydrogen content on a more or less continuous basis.

Previous arrangements for analyzing dissolved hydrogen content include chemical methods wherein a sample of the aforesaid solvent is extracted intermittently from the pressurized system. The dissolved gases are then isolated from the sample by evacuation, the oxygen present is removed by exposing the gases to yellow phosphorous for 15 to 20 minutes and the hydrogen content is determined by measuring the volume reduction of the remaining gases after being exposed to heated cupric oxide for about 20 minutes. The last-mentioned volume reduction, of course, is caused by the oxidation of hydrogen gas to water by the cupric oxide.

This method, although satisfactory in certain cases, provides only an intermittent measurement of the dissolved hydrogen concentration and requires from one to one and one-half hours to complete each analysis. Moreover, complicated and graduated items of laboratory equipment are required, which equipment usually comprises various items of fragile glassware and evacuating mechanisms. Thus, it is seen that this prior arrangemnt, which is rather time consuming, does not permit a continuous monitoring of the hydrogen concentration and that skilled personnel are required for conducting the analysis.

In another arrangement proposed heretofore, a palladium tube is immersed within the aforesaid pressurized system containing dissolved hydrogen and a circulating solvent, and the concentration of hydrogen is determined by measuring the pressure of hydrogen gas which diffuses through the tube from the solvent. At a given temperature the pressure developed within the tube by hydrogen diffusion is proportional to the concentration of the hydrogen dissolved in the solvent. In this apparatus a reproducible equilibrium is set up between the diffused hydrogen contained within the tube and the hydrogen dissolved in the solvent. Consequently, this arrangement is capable of producing accurate results on a more or less continuous basis. However, the response of this prior device to changes in dissolved hydrogen concentration is rather slow unless the solvent is heated to a temperature of 450° F. to 600° F. and the volume within the palladium tube is made relatively small. Moreover, in the diffuser tube arrangement, a vacuum-tight system is required and the ambient temperature of the palladium must be substantially constant.

In view of the foregoing an object of the invention is to provide a novel and efficient hydrogen gauge.

Another object of the invention is the provision of a hydrogen gauge having a minimum of component parts adapted for use in a relatively wide range of temperatures.

A further object of the invention is the provision of a novel hydrogen gauge which is adapted for use in measuring the concentration of dissolved hydrogen in a liquid solvent.

Still another object of the invention is a provision of a hydrogen gauge having associated therewith novel means for compensating changes in ambient temperature and, if desired, for measuring these temperature changes.

A still further object of the invention is the provision of a hydrogen gauge having means associated therewith for adapting it for use within a sealed system and at elevated temperatures and pressures.

Yet another object of the invention is the provision of a hydrogen gauge having means associated therewith for decreasing the response time thereof to changes in hydrogen concentration.

These and other objects, features and advantages of the invention will be made apparent by the ensuing description of illustrative modifications of the invention, when taken in conjunction with the accompanying drawings, wherein.

Figure 1:
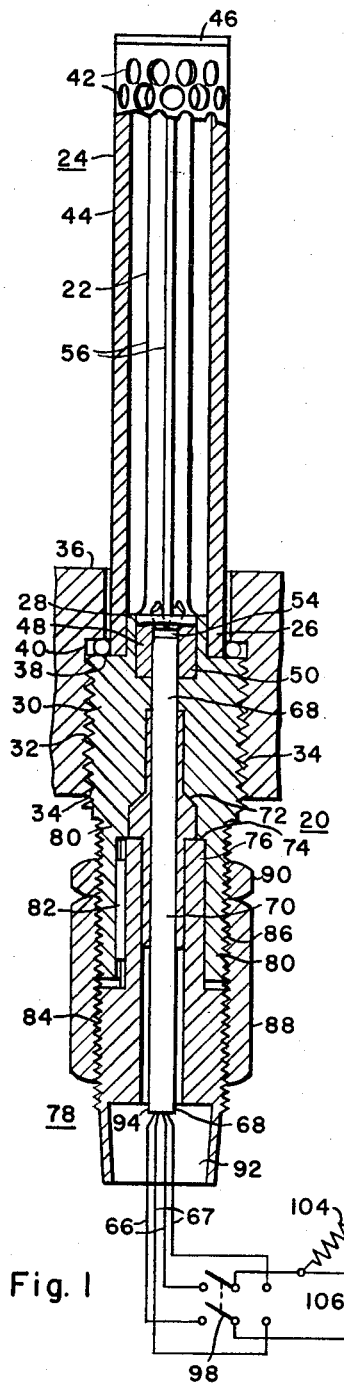
FIGURE 1 is an elevational view of one form of the hydrogen gauge including resistance measuring circuitry and arranged in accordance with the invention, with parts having been broken away and other parts having been sectioned for the purposes of illustration.

It has been found, in accordance with the invention, that a palladium wire will absorb hydrogen from a solvent even though the hydrogen is maintained in solution within the solvent at elevated temperatures and pressures. It has been found further that the amount of hydrogen absorbed by the palladium wire of a given volume is proportional to the concentration of the hydrogen dissolved with a liquid system. This invention contemplates a device employing these principles and capable of being installed more or less permanently within a pressurized liquid system containing the dissolved hydrogen. Means are associated with the device for compensating changes in response thereof which are due solely to changes in temperature of the solvent. The hydrogen gauge arranged in this fashion is adapted for convenient operation on a continuous basis, and, because of the comparatively small volume of palladium comprised in the aforesaid wire, the response of the device to changes in hydrogen concentration within a system is relatively quick.

In one arrangement of the invention the aforesaid compensating means also is employed to provide temperature indications of the fluid circulating in the aforesaid pressurized system.

Referring now more particularly to the drawings, the hydrogen gauge illustrated therein and arranged according to the teachings of the invention comprises a support and sealing means or packing gland 20, a mandrel 22, and a tubular perforated housing 24 into which the mandrel 22 is inserted. The housing 24 is interiorly threaded adjacent its outward end 26 and is secured thereby to a forwardly extending tubular projection 28 of the packing gland 20. Desirably, the housing 24 is fabricated from a corrosion resistant material such as stainless steel, zirconium, or a zirconium alloy. The housing 24, moreover, is of such size that there is considerable space between it and the mandrel 22 so the fluid of the system entering perofrations 42 of the housing will freely contact the outer surfaces of the mandrel 22.

The packing gland 20 is of conventional design and the body portion 30 thereof is provided with an exterior thread 32 whereby the packing gland 20 in this example is engaged within a tapped aperture 34 of a wall portion 36 associated with the aforementioned sealed system. The tapped aperture 32 is reduced at an inwardly extending shoulder 38 to a smaller opening through which the housing 24 and the mandrel 22 are inserted when the body portion 30 is thus threaded into the aperture 32. When positioned in this manner, the body member 30 of the packing gland 20 is sealed to the wall portion 36 by means of a sealing ring 40 inserted between the inward end of the body portion 30 and the shoulder 38 of the aperture 32.

Figure 2:
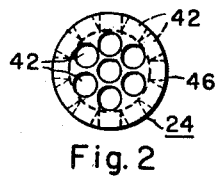
FIG. 2 is an end view of the inner end of the housing provided for the hydrogen gauge illustrated in FIG. 1.

As indicated heretofore, the housing 24 is provided with a plurality of holes or perforations 42 formed in the cylindrical wall 44 of the housing 24 and also in the inward end closure 46 of the housing 24, as better shown in FIG. 2 of the drawings. With this arrangement, the housing 24 protects the relatively fine wires, presently to be described, which are wound upon the mandrel 22 and permits ready access of the fluid circulating in the system to these wires.

Figure 4:
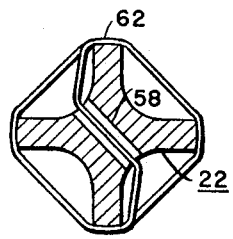
FIG. 4 is a cross-sectional view of the mandrel illustrated in FIG. 3 and taken along reference lines IV—IV thereof.
Figure 5:
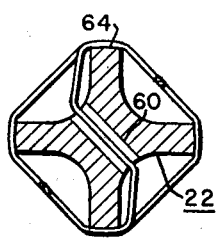
FIG. 5 is another cross-sectional view of the mandrel illustrated in FIG. 3 and taken along reference lines V—V thereof.
Figure 7:
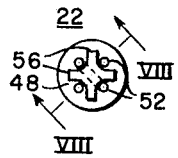
FIG. 7 is an end view of the inner end of the mandrel shown in FIG. 6.

The mandrel 22 in this example of the invention is fabricated with a generally cruciform configuration as shown in FIGS. 4, 5 and 7 and is furnished with a hollow generally cylindrical end portion 48. The hollow end portion 48 is exteriorly threaded and the mandrel 22 is supported in the aforedescribed manner relative to the housing 24 by threading the end portion 48 into a complementary, threaded cavity 50 of the packing gland tubular extension 28. The cruciform configuration of the mandrel likewise aids in facilitating contact of hydrogen bearing fluid with the aforesaid wires.

As shown in appropriate figures of the drawings and more particularly to FIG. 7, the mandrel 22 is provided with, in this example, four divergent passages 52 which communicate with the interior 54 of the hollow end portion 48 and which open upon the surface of the cruciformed mandrel 22 between adjacent mandrel arms 56. Through these divergent passages 52 and through sealing means associated with the packing gland 20, the ends of the windings described hereinafter are brought out for connection to suitable electric resistance measuring circuitry.

Figure 3:
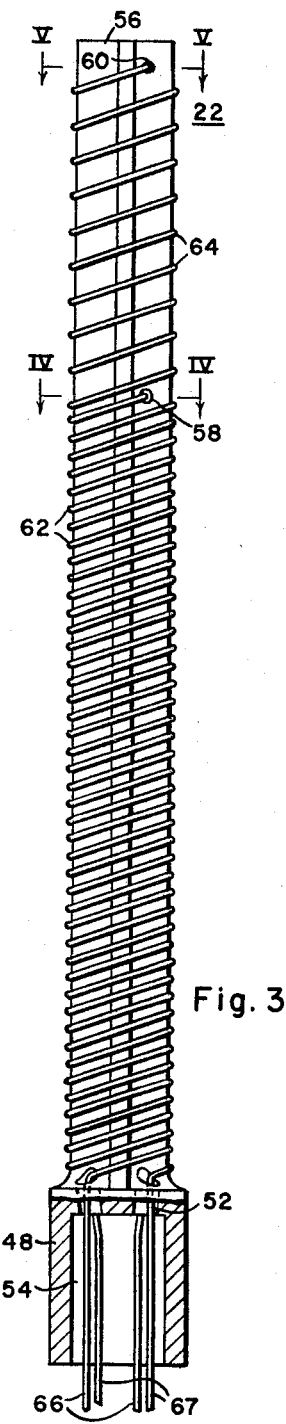
FIG. 3 is an enlarged elevational view of the mandrel associated with the hydrogen gauge of FIG. 1 with a portion of the mandrel having been sectioned for purposes of illustration.
Figure 6:
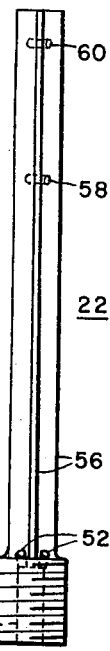
FIG. 6 is another elevational view of the mandrel illustrated in FIG. 3 with parts thereof having been removed for clarity.

With particular reference now to FIGS. 3 to 5 of the drawings, it is seen that the mandrel 22 of the hydrogen gauge illustrated in FIG. 1 is furnished, in this example, with a pair of windings 62 and 64, the purposes of which will be elaborated upon as this description proceeds. These windings consist of wires which are wound upon the mandrel 22 and are disposed, as presently to be described in greater detail, within a four-start series of multiple thread-type grooves, that is to say, a series of grooves arranged in the form of four individual but parallel helices. As shown in FIGS. 4 and 5 of the drawings, the mandrel 22 has a pair of spaced openings 58 and 60 extending transversely therethrough with the outermost opening 60 being disposed adjacent the inward end of the mandrel 22. With this arrangement, the pair of wires 62 and 64 are wound individually in parallel helical relationship along the length of the mandrel 22. Each of the wires 62 and 64 is inserted in appropriate ones of the aforesaid grooves, is wound along the length of the mandrel 22 as shown in FIG. 3 of the drawings, is passed through the opening 58 or 60, respectively, and is then doubled back on itself, as it were, in the remaining two helical grooves to the beginning of the winding at a point adjacent the cylindrical end portion 48 of the mandrel. In this example the individual turns of the shorter winding 62 lie respectively between adjacent turns of the other winding 64.

As shown in FIG. 1, the ends of each of the windings 62 and 64 are then passed through adjacent ones of the divergent passages 52, respectively, where they are connected to individual electric leads 66 and 67. The electric leads 66 and 67 extend through four spaced longitudinal passages of an elongated, electrically insulating member 68 which, in turn, extends the length of the packing gland 20, from which the aforesaid leads 66 and 67 protrude for connection to suitable metering circuitry presently to be described. The member 68 is fabricated for example from fused or sintered aluminum oxide or other ceramic material and the leads 66 and 67 are sealed therein through the use of a lava-type sealant.

The insulating member 68, with the leads sealed therein, passes through a central longitudinal passage of a packing gland seating member 70 and is sealed within the aforesaid passage by means of a suitable sealant such as that noted above. The seating member 70 is furnished with a frusto-conical portion 72 which engages a complementary section of the body portion 30. When an inwardly directed force is applied to shoulder 74 of the seating member 70, in a manner to be described, a seal is effected between the body portion 30 and the seating member 70. The outward end of the seating member 70 is threaded into a tubular extension 76 of a hollow cylindrical member 78. The extension 76 fits closely and slidably within a larger tubular extension 80 of the body portion 30. Relative longitudinal movement between the extensions 76 and 80 is permitted, but relative rotation therebetween is prevented by the slot-and-key arrangement indicated by the reference character 82. The aforementioned force, therefore, is applied to the seating member shoulder 74 by causing the extension 76 to move inwardly of the stationary body portion outer extension 80.

One arrangement for causing such movement includes reversely threading the outer surfaces 84 and 86 of the cylindrical member 78 and of the body portion outer extension 80, respectively. Relative longitudinal movement between the aforesaid extensions is then effected by turning nut 88. After properly engaging the seating member 70 with the body portion 30 by the aforesaid inward movement of the cylindrical member extension 76, the nut 88 is secured by a lock nut 90 likewise threaded upon the outer extension 80. Loosening of the cylindrical member 78 and the seating member 70 is prevented by the aforementioned keying arrangement 82. A cavity 92 is formed adjacent the outer end of the cylindrical member 78, from which the leads 66 and 67 emerge. This cavity is filled with potting compound of the aforementioned lava sealant in order to insulate these leads from surrounding metal parts and to prevent sharp bending thereof at the outer end 94 of the ceramic insulator 68.

In accordance with the invention, the wire 64, which is wound upon the mandrel 22 as aforesaid, is fabricated from a material capable of sorption of hydrogen and having the property of changing electrical resistivity in proportion to the amount of hydrogen absorbed or adsorbed as the case may be. The other mandrel winding 62 is made from a material that does not adsorb or dissolve hydrogen, or whose resistivity does not change upon sorption of hydrogen. The mandrel 22 either is formed from an electrically insulating material, for example, fused or sintered aluminum oxide or other ceramic or refractory oxide, or is provided with an insulating coating to avoid electrically shorting the adjacent turns of the windings 62 and 64. The wires from which these windings are formed each are drawn to about the same diameter which, in this example, is of the order of a few mils in order to increase the sensitivity of the hydrogen gauge. When the hydrogen gauge is used in a corrosive environment, such as pressurized, high temperature water, it is important to fabricate the windings 62 and 64 from materials having the necessary corrosional resistance.

As noted heretofore, it has been found that palladium will absorb dissolved hydrogen directly from a liquid solvent containing the same when the palladium is immersed therewithin, with the amount of absorbed hydrogen being proportional to the concentration of dissolved hydrogen. Since the hydrogen absorbed by a palladium wire proportionately changes the electrical resistivity thereof, the change in total resistance of a given length of palladium wire varies in proportion to the concentration of hydrogen in the solvent. In this arrangement of the invention, then, the winding 64 is made from palladium, although other materials having similar properties can be utilized. In the case of water containing dissolved hydrogen the aforesaid changes in resistance of the palladium wire 64 vary linearly with the square root of the hydrogen concentration in the water. The amount of absorbed hydrogen in the palladium wire reaches the equilibrium value relatively quickly for a given temperature of the water or other solvent, due to the small diameter of the palladium wire 64. As a result, the concentration of dissolved hydrogen in the aforesaid water or other solvent can be continuously monitored by maintaining the solvent at a constant temperature and measuring the electrical resistance of the palladium wire 64. This resistance can be measured by a suitable ohmmeter (not shown), for example, or for improved accuracy by a Wheatstone bridge arrangement denoted by the reference character 96 (FIG. 1) and coupled to the palladium winding 64 through the leads 67 and a double-pole, double throw switch 98.

When it is not desirable or feasible to maintain constant the temperature of the hydrogen containing fluid in which the hydrogen gauge is immersed, the gauge can still be employed for continuously monitoring dissolved hydrogen concentration over a range of temperatures, by providing the hydrogen gauge with suitable temperature compensating means arranged in accordance with the invention. The aforesaid temperature compensating means is adapted to compensate for changes in electrical resistance of the palladium winding 64 which are due solely to changes in temperature of the fluid and not to changes in the amount of hydrogen absorbed by the palladium 64 as determined by the hydrogen component of the fluid.

One form of the aforesaid temperature compensating means, as contemplated by the invention, includes the winding 62 which is wound as aforesaid with the winding 64 and whose resistivity is substantially unaffected by the presence of or changes in the hydrogen environment. One material suitable for making the winding 62 is platinum, chosen for the reasons that its thermal coefficient of resistivity is very nearly equal to that of palladium and that platinum has excellent corrosional resistance. Obviously, other materials having thermal coefficients substantially equivalent to that of the hydrogen absorbing winding 64 can be employed depending upon the desired corrosional resistance and, of course, upon the material selected for winding 64. In this arrangement of the invention, due to the higher resistance of the platinum winding 62, the latter winding is furnished with a shorter overall length than that of the palladium winding 64 in order that the initial electrical resistance of each winding, that is to say, before any hydrogen is absorbed by the palladium winding 64, will be about equal. In the case where the windings 62 and 64 are formed respectively from platinum and palladium, the platinum winding 62 is furnished with an overall length of about three-fourths that of the palladium winding 64 assuming, of course, that the diameter of each of the wires from which the windings 62 and 64 are formed is the same. Obviously, palladium and platinum wires (not shown) of about equal lengths can be utilized where desired, if their initial resistances are equalized by suitable differentiation in their respective diameters.

The temperature compensating winding 62 is formed, in this example, from platinum for the reason as aforesaid that platinum and palladium each having approximately the same temperature coefficients of electrical resistivity, which are 0.0039 and 0.0037 per degree centigrade, respectively. Due to the slight difference in these temperature coefficients, the compensated hydrogen gauge, when the volume of its platinum winding is exactly three-fourths that of the palladium winding, is most accurate when the gauge is operated in a temperature range in the neighborhood of 450° F. By making slight adjustments in the relative lengths or initial resistances of these windings, a similarly high accuracy can be obtained, if desired, for other temperature ranges. The change in resistance of the temperature compensating winding 62 due to temperature changes of the fluid can be measured by the Wheatstone bridge arrangement 96 to which the ends of the winding 62 are connected through the leads 66 and the double-pole double-throw switch 98. On the other hand, if an ohmmeter (not shown) is employed to measure the resistances of the windings 62 and 64, the ohmmeter can be calibrated to read directly the temperature of the fluid, as well as the ohmic resistance of the windings. In the Wheatstone bridge circuit 96, as shown in FIG. 1, either of the windings 62 or 64 is coupled opposite the adjustable resistor 100 by suitable manipulation of the double-pole double-throw switch 98. With the remaining resistances 102 and 104 being equal, the resistance of each winding 62 or 64 is found by individually coupling each winding into the bridge circuit and adjusting the resistor 100 until the galvanometer 106 indicates zero potential difference. At this point the resistance of the winding 62 or 64 being tested equals that of the adjustable resistor 100. A scale (not shown) associated with the latter desirably is calibrated to read directly the resistance in ohms of either winding 62 and 64 and also the temperature of the hydrogen bearing fluid as represented by the change in resistance of the temperature compensating winding 62.

The ohmic resistance of the palladium wire 64, of course, reflects both the change in temperature of the fluid as well as the change in hydrogen concentration thereof. Accordingly, the difference in the resistance measurements obtained from the windings 62 and 64 is that due to the amount of hydrogen absorbed by the palladium winding from the fluid in which the mandrel 22 is immersed. It is this difference, then, which varies linearly, as stated heretofore, with the square root of the hydrogen concentration dissolved in the aforesaid solvent. It will be appreciated that suitable metering circuitry, presently to be described, can be coupled to both pairs of leads 66 and 67 and can be arranged to yield this differential resistance directly. The meter indicating this resistance, if desired, can be calibrated to read directly the hydrogen concentration of the solvent in terms of any convenient units. Thus a skilled technician is not required to operate the hydrogen gauge of the invention.

One form of differential resistance measuring circuit suitable for use with the invention as described above is illustrated in FIG. 9 of the drawings. This circuit is a modified bridge arrangement in which the platinum and palladium windings 62 and 64 are coupled in arms A and B of the bridge. A variable resistance 108 also is connected in arm A in series with the temperature compensating winding 62, whose resistance is expected to be equal to or smaller than that of the hydrogen sensitive winding 64. The remaining arms C and D of the bridge network include equal resistances 110 and 112 and a potential is applied to points 114 and 116 by a battery 118 or other source of steady, direct current potential. The bridge network is in a balanced condition, as is well-known, when a galvanometer 122 or the like indicates the absence of a voltage potential between points 124 and 126. At this time the total resistance in each of arms A and B must be equal. The same is true of arms C and D, which is effected by provision of the equal resistances 110 and 112. The bridge can be balanced, then, by suitably adjusting the variable resistance 108, which desirably ranges from zero to a point somewhat higher than the anticipated differential resistance between the windings 62 and 64. When adjusted for bridge balance, the resulting value of the variable resistor 108 obviously will exactly equal the difference in resistance between the palladium winding 64 and the platinum winding 62. This differential resistance is proportional to the square root of the dissolved hydrogen concentration in water, for example, and consequently either the differential resistance or the dissolved hydrogen concentration or both can be calibrated directly upon a scale and indicator (not shown) associated with the variable resistance 108 in the conventional manner.

Figure 9:
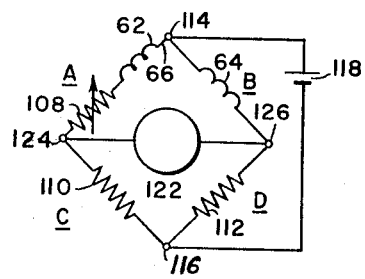
FIG. 9 is a schematic circuit diagram of one form of differential resistance measuring circuitry arranged for use with the hydrogen gauge of the invention.

Another form of differential resistance measuring circuit is illustrated in FIG. 9. In the latter circuit the windings 62 and 64, whose electrical resistances are represented by $R_x$ and $R_y$, respectively, are connected in parallel-series with a pair of equal resistances 128 and 130 to a source of direct current potential 132. Although both $R_x$ and $R_y$ may be changing when the hydrogen gauge is in use, only the differential resistance $(R_y-R_x)$ need be found, which is related solely to the hydrogen concentration as explained heretofore. As shown by the following mathematical relationships, this differential resistance is proportional to the potential difference between the points 134 and 136 of the measuring circuit. For purposes of illustration, assume that $R_x=R_y$ and that $V_x$ is the potential at point 134 and $V_y$, at point 136; then it is obvious that $V_x-V_y=0$ inasmuch as the resistances 128 and 130, each represented by $R_o$ in the following analysis, are equal. Desirably, the equal resistances 128 and 130 are quite high in ohmic value in order to reduce the current drain on the battery 132.

As is well known the potential $V_o$ of the battery 132 is applied equally to both resistance branches: thus, $$V_o = I_x R_x + I_x R_o \quad (1)$$
$$V_o = I_y R_y + I_y R_o \quad (2)$$

where $I_x$ and $I_y$ equal the currents flowing through points 134 and 136, respectively. Equating Equations 1 and 2 and transposing:

$$I_y R_y - I_x R_x = (I_x - I_y) R_o \quad (3)$$

Dividing by $I_y$:

$$R_y - \frac{I_x R_x}{I_y} = \frac{I_x - 1}{I_y} R_o \quad (4)$$

Considering Equations 1 and 2 and noting again that resistances 128 and 120 ($R_o$) are equal, the following relationships obviously exist; relative to the potentials $V_x$ and $V_y$ at the points 134 and 136, respectively:

$$V_x = I_x R_o = V_o - I_x R_x \quad (5)$$
$$V_y = I_y R_o = V_o - I_y R_y \quad (6)$$

Subtracting Equation 6 from Equation 5 the following are obtained:

$$V_x - V_y = I_y R_y - I_x R_x \quad (7)$$
$$V_x - V_y = (I_x - I_y) R_o \quad (8)$$

Dividing Equation 8 by $I_y$:

$$\frac{V_x - V_y}{I_y} = \left(\frac{I_x}{I_y} - 1\right) R_o \quad (9)$$

Combining Equations 4 and 9:

$$R_y - \frac{I_x R_x}{I_y} = \frac{V_x - V_y}{I_y} \quad (10)$$

The relationship (10) is obtained also by dividing Equation 7 by $I_y$.

Figure 8:
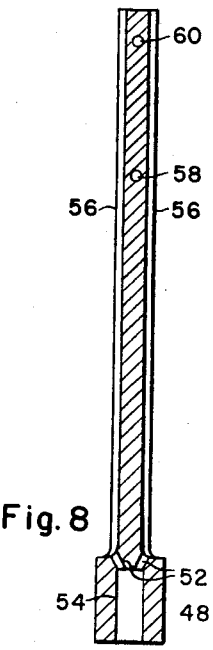
FIG. 8 is a longitudinally sectional view of the mandrel illustrated in FIG. 6 and taken along reference lines VIII—VIII of FIG. 7.
Figure 10:
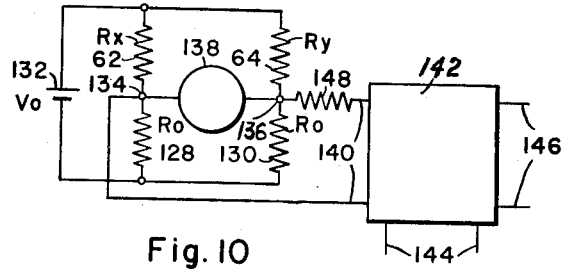
FIG. 10 is a schematic circuit diagram of another form of differential resistance measuring circuitry arranged for use with the hydrogen gauge.

Thus it is readily apparent that the differential resistance $(R_y-R_x)$ of the windings 64 and 62 is equal to a function of the potential difference $(V_x-V_y)$ between the points 134 and 136. This potential difference can be measured by a sensitive galvanometer 138, or the like, which can be then calibrated to read directly either the differential resistance or the hydrogen concentration. The measuring circuit depicted in FIG. 9 yields an immediate reading without delays such as are incurred in adjusting a variable resistor, for example, the resistances 100 and 108 shown in FIGS. 1 and 8, or the like.

Moreover the potential difference or output $(V_x-V_y)$ of the last described measuring circuit can be supplied through conductors 140 to conventional amplifying circuitry, denoted generally by reference character 142. The amplifier 142 is coupled to a source of supply voltage (not shown) through a pair of leads 144 and the output of the amplifier is connected, for example, to suitable servomechanism (not shown) by means of conductors 146. A tripping circuit (not shown) can be associated with the amplifier 142 to cause the latter to produce an output voltage when the hydrogen concentration, as represented by the potential difference $(V_x-V_y)$, falls below an accepted level. The aforesaid servo-mechanism when so energized can be arranged to actuate a suitable arrangement for adding hydrogen to the system being monitored. One form of such hydrogen adding arrangement is described and claimed in a copending application of S. A. Weber, entitled "Hydrogen Gauge," Serial No. 638,847, filed February 7, 1957 and assigned to the present assignee.

A very high impedance 148 desirably is connected in one of the signal leads 140 in order that the correct drain, resulting from the signal thus applied to the amplifier when connected between the points 134 and 136 of the measuring circuit, will be substantially zero, and therefore, any effect upon the reading of the galvanometer 138 will be negligible.

From the foregoing, it will be apparent that novel and efficient forms of a hydrogen gauge have been disclosed herein. The invention is adapted particularly for use in monitoring the dissolved hydrogen concentration of a liquid system on a continuous basis and, in one arrangement thereof, for indicating the ambient temperature of the medium in which the gauge is operated and for compensating for the effect of variations in ambient temperature. Because of the novel construction of the gauge, the response thereof is relatively quick in regard to changes of hydrogen concentration and the gauge can be utilized over a wide range of temperatures by relatively unskilled personnel. Moreover, the hydrogen gauge of the invention does not require the use of evacuating equipment and comprises a minimum number of component parts, which are sufficiently ruggedized for use in conjunction with systems maintained at relatively high temperatures and pressures.

It will also be appreciated from the foregoing that the illustrative and descriptive matter employed herein is presented for purposes of exemplifying the invention and, thus, should not be construed as limitative in nature.

Moreover, it is to be understood that certain features of the invention can be employed without a corresponding use of other features thereof.

Therefore, what is claimed as new is:

1. A hydrogen gauge comprising an elongated cruciform mandrel, a wire fabricated from a material having the property of changing electrical resistance in response to changes in environmental hydrogen concentration, said wire being wound along the length of said mandrel, a second wire fabricated from a material different from said first-mentioned conductor but whose electrical resistance does not change substantially in response to changes in said hydrogen concentration, said second wire having a bared portion thereof wound along the length of said mandrel in spaced relation to said first-mentioned wire, said second wire having about the same temperature coefficient of resistance as that of said first-mentioned wire, means for electrically insulating the adjacent turns of said wires from each other and from said mandrel, means joined to said mandrel for supporting said mandrel and for connecting said wires, respectively, to exterior metering circuitry, and a perforated housing surrounding said mandrel and secured to said supporting means.

2. A hydrogen gauge comprising an elongated cruciform mandrel having multiple thread-type grooves formed along the length thereof, a first conductor fabricated from a material having the property of changing electrical resistance in response to changes in environmental hydrogen concentration, said conductor being wound along the length of said mandrel and disposed in at least one series of said grooves, a second conductor fabricated from a material different from said first conductor but whose electrical resistance does not change substantially in response to changes in said hydrogen concentration, a bare portion of said second conductor being wound along the length of said mandrel in spaced relation to said first conductor and being disposed in at least one of the remaining series of said grooves, said second conductor having about the same temperature coefficient of resistance as that of said first conductor, means for electrically insulating the adjacent turns of said wires from each other and from said mandrel, means joined to said mandrel for supporting said mandrel and for connecting said conductors to external metering circuitry, and an elongated perforated housing surrounding said mandrel and secured to said mandrel supporting means.

References Cited in the file of this patent

UNITED STATES PATENTS

| | | |
|---|---|---|
| 1,559,461 | Ruben | Oct. 27, 1925 |
| 2,080,953 | Rensch | May 18, 1937 |
| 2,116,239 | Hebler | May 3, 1938 |
| 2,751,777 | Cherrier | June 26, 1956 |